United States Patent
Raskar et al.

(10) Patent No.: US 6,795,069 B2
(45) Date of Patent: Sep. 21, 2004

(54) FREE-FORM MODELING OF OBJECTS WITH VARIATIONAL IMPLICIT SURFACES

(75) Inventors: Ramesh Raskar, Somerville, MA (US); Olga Karpenko, Providence, RI (US); John F. Hughes, Barrington, RI (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 217 days.

(21) Appl. No.: 10/156,980

(22) Filed: May 29, 2002

(65) Prior Publication Data

US 2003/0222868 A1 Dec. 4, 2003

(51) Int. Cl.[7] .............................................. G06T 15/00
(52) U.S. Cl. ..................................................... 345/419
(58) Field of Search ................................ 345/167, 419, 345/606, 441, 442, 427, 443, 773, 582, 420, 422, 473, 586, 629, 630, 645, 648, 649, 650, 651, 652, 653, 654, 757, 764, 769; 340/729; 352/57

(56) References Cited

U.S. PATENT DOCUMENTS 6,549,201 B1 * 4/2003 Igarashi et al. ............. 345/423

* cited by examiner

*Primary Examiner*—Mark Zimmerman
*Assistant Examiner*—Enrique L Santiago
(74) *Attorney, Agent, or Firm*—Dirk Brinkman; Andrew J. Curtin (57) ABSTRACT

An input device is used to generate input strokes on a display device. The input strokes are acquired and resampled to be evenly spaced. Then, depth values are assigned to the resampled 2D points to form 3D contours. Variational implicit surfaces are fitted to the 3D contours to generate 3D blobs forming the 3D model to be rendered on an output device. The blobs can be merged by guidance strokes, and modified by target strokes.

12 Claims, 12 Drawing Sheets

FREE-FORM MODELING OF OBJECTS WITH VARIATIONAL IMPLICIT SURFACES

FIELD OF THE INVENTION

The invention relates generally to computer graphics, and more particularly to free-form modeling of renderable objects.

BACKGROUND OF THE INVENTION

A number of graphical user interfaces (GUI) for modeling three-dimensional objects are known. For instance, "Sketch" is an interface designed to help a user with geometric modeling, see Zeleznik et al., "Sketch: An Interface for Sketching 3D Scenes," Proceedings of SIGGRAPH-96, 1996. Sketch uses a system of intuitive guesses to guide the user through geometrical model generation. For example, if the user draws three line segments meeting at one point and parallel to the projections of the x-, y- and z-axes of the scene, then Sketch generates a parallelepiped whose dimensions are determined by the lengths of the line segments. After the user has mastered a set of agreements like that, more complex models composed of many primitives can be generated.

Another system can be used for sketching CAD-like geometric objects, see Lipson et al., "Conceptual design and analysis by sketching," Proceedings of AIDAM-97, 1997. In an input sketch, the user draws both visible and hidden contours of a rectilinear object from which its shape is inferred. Their approach is based on correlations among arrangements of lines of the 2D drawing and lines in 3D space. For instance, by experimentation, the user can notice that the more two lines are parallel in the 2D sketch plane, the more the lines are likely to represent parallel lines in 3D space. They rely on a geometric correlation hypothesis that one can evaluate the likelihood of human understanding of the sketch by a joint probability of all correlations in the sketch.

Igarashi et al. also describe an interface for free-form modeling, see Igarashi et al. "Teddy: A sketching interface for 3D freeform design," Proceedings of SIGGRAPH 99, pp. 409–416, 1999. There, the user inputs a simple closed stroke to form a contour. The system then generates a model in the form of a polygon mesh that matches the contour. The user adds details by editing the polygon mesh. Operations such as extrusion, cutting, bending and drawing on the mesh are allowed. However, because the underlying surface representation is a polygonal mesh, maintaining a smooth surfaced model is a problem.

Tolba et al. describe a system that allows the user to draw a scene with 2D strokes, and then to view the scene from different points of view as if a 3D scene was generated. The system projects the 2D strokes onto a sphere having its center at the viewing frustum. The strokes can then be rendered in perspective. The purpose of their system is to provide perspective drawing and not a 3D model of a scene, see Tolba et al., "Sketching with projective 2d strokes," ACM Symposium on User Interface Software and Technology, pp. 149–157, 1999, and Tolba et al., "A projective drawing system," I3D'01, pp. 25–34, 2001.

Another system correlates features in a hand-drawn figure to a textured, 3D model. The 3D model is then distorted with a warp to conform to the hand-drawn figure. The warp distorts the model in two dimensions to match the figure from a given camera perspective, yet preserves 3D effects, such as self-occlusion and foreshortening, see Petrovic, "Shadows for cel animation," Proceedings of SIGGRAPH 2000," pp. 511–516, 2000.

With respect to underlying model representations, implicit-surface modeling is described by Bloomenthal, in "Introduction to Implicit Surfaces," Morgan-Kaufmann, 1997.

The "Skin" system supports a form of constructive drawing. There, the user generates a set of basic forms over which a skin is placed. The characteristics of the forms are then modified by small adjustments to offset distances at various scales of subdivision of the skin mesh. The skin is basically a polygonization of an implicit surface that is defined by a combination of signed-distance representations of the underlying forms, see Markosian, "Skin: A constructive approach to modeling free-form shapes," Proceedings of SIGGRAPH 99, pp. 393–400, 1999.

In contrast, Wyvill et al. describe a blob-tree. The blob-tree is a CSG like hierarchy of implicit models in which implicit shapes are combined by a rich collection of operators, including various deformation operators. The emphasis in that work is on the representation of complex implicit surfaces through a tree-like structure, see Wyvill et al., "The Blob Tree, Warping, Blending and Boolean Operations in an Implicit Surface Modeling System," Implicit Surfaces 3, 1998.

Barthe et al. describe a method for blending a pair of implicit surfaces defined as zero-sets of functions $f$ and $g$ by considering each point of $R^3$ as having $f$ and $g$ "coordinates," i.e., by treating a mapping a. $(f, g):R^3 \to R^2:p \to (f(p), g(p))$ as a "coordinatization" of 3D space. A first surface is a pre-image of the $f=0$ axis, and a second is the pre-image of the $g=0$ axis. By examining pre-images of other curves in $(f, g)$-space, especially ones containing large portions of these two axes, they can blend between the two surfaces, see Barthe et al., "Implicit extrusion fields," The 2000 International Conference on Imaging Science, Systems, and Technology (CISST'2000), pp. 75–81, 2000.

Variational implicit surfaces are described by Turk et al., in "Shape transformation using variational implicit functions," SIGGRAPH'99, 1999. Variational implicit surfaces can be used to represent complex objects, as described by Carr et al. in "Reconstruction and representation of 3d objects with radial basis functions," Proceedings of SIGGRAPH 2001, pp. 67–76, 2001. Their methods allows one to simplify model representations by judicious deletion of constraint points.

SUMMARY OF THE INVENTION

The present invention uses variational implicit surfaces to support a set of free-form modeling operations. The modeling operations are inflation, hierarchy generation, merging, and modification. The inflation, merging and modification operations are implemented in a similar way by removing some constraints on the variational implicit surface and introducing others. This uniformity leads to simplicity of system structure and process coding.

More particularly, an input device is used to generate input strokes visible on a display device. The input strokes are acquired and resampled to be evenly spaced. Then, depth values are assigned to the resampled 2D points to form 3D contours. Variational implicit surfaces are fitted to the 3D contours to generate 3D blobs that form the 3D model to be rendered on an output device. The blobs can be merged by guidance strokes, and modified by target strokes.

DETAILED DESCRIPTION OF THE PREFERRED EMBODIMENT

Many free-form sketching techniques teach a student to first draw simple components that conform to the shape of an object to be modeled, e.g., cylinders for arms and legs, a sphere for the head, and rectangles for the torso. The simple components can then be merged and modified to form a final model of the object, see Ames, Ed. "Draw 50 Animals," Main Street Books, 1985. Our invention provides a system and method for modeling objects that is based on this free-form sketching technique.

Figure 1:
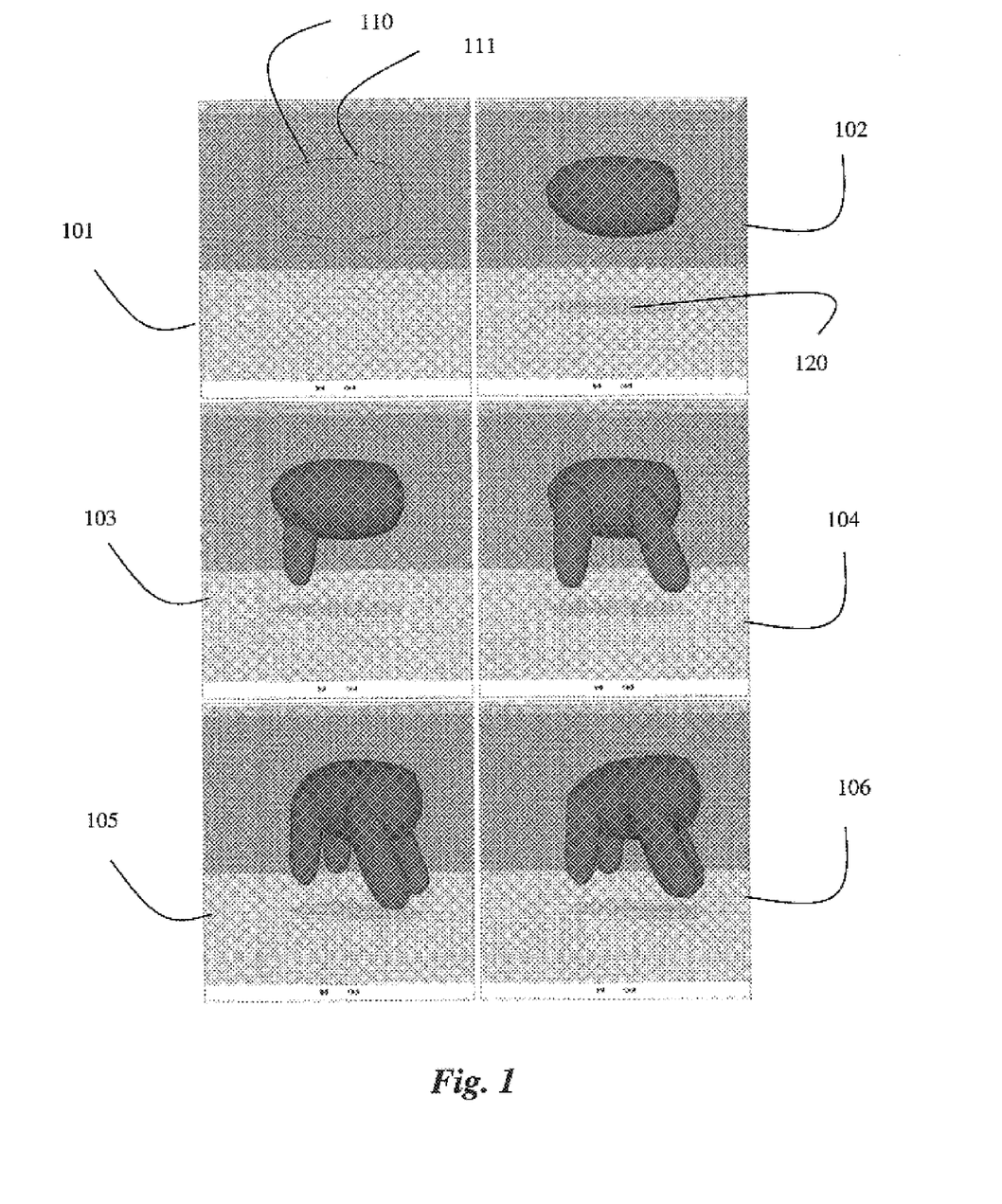
FIG. 1 shows panels of free-form modeling of objects according to the invention.

As shown in panels 101–106 of FIG. 1, a user draws closed strokes with an input device, e.g., a mouse and cursor. The closed strokes form contours. The contours are "inflated" to 3D "blobs." The blobs can then be merged and modified into a renderable model.

A typical interaction session begins with a view of the world with nothing in it but a horizontal "ground plane." The ground plane corresponds to the x- and z-directions in our coordinate system, with the y-direction pointing upwards. The user can sketch an outline 110 depicting parts of a body of an animal, see panel 101. If necessary, a gap 111 in the stroke is closed by joining the end to the beginning of the stroke.

The closed 2D stroke is projected to a 3D contour, and the contour is inflated into a three-dimensional blob in panel 102. The thickness of the blob is related to the dimensions of the 2D contour, subject to predetermined constraints. The user can then draw further strokes indicating the legs of the animal, as shown in panels 103–104. These are again drawn at the same depth as the first blob, but the depth may be adjusted as described below. Panel 105 shows the model from a different viewpoint. Because later drawn blobs overlap the first blob, the system infers that the blobs are to be attached or "merged with each other as shown in panel 106.

The merged blobs are placed over a modeling hierarchy with the first blob as a parent, and the other blobs as children, as described below in greater detail.

If the parent blob is later moved, e.g., by rotation or translation, using the mouse, the child blobs are moved as well. As the parent is determined, it briefly turns a different color to indicate what inference has been made. If a newly-drawn blob overlaps multiple other blobs, then one of these blobs is selected as its parent, based on a degree of overlap in the image plane. If the position of the newly-formed blob is not ideal, the user may select the blob, or any other blob. At this point, a transparent bounding sphere is displayed for use as a "virtual sphere rotater," and the color of a shadow 120 of the selected blob is changed to make it easier to identify the selected blob.

The user can then translate the selected blob, together with any children, in the xy-plane, translate the blob and its children in the xz-plane by dragging the shadow 110 of the object, or rotate the model around either its center of mass or the center of mass of its intersection with the parent. The choice of operation is based on where the user clicks the mouse when starting to drag the mouse cursor. If the click is inside the bounding sphere, then a trackball rotation operation is performed. If the user clicks on the shadow of the blob or near it, which we define as "inside the shadow of the bounding sphere of the blob," then the model moves in the xz-plane. Otherwise, the model moves in the xy-plane. The amount of xy translation is determined by a vector from the first-click to the current mouse-point. The model is translated by this vector in the xy-plane.

Having drawn the legs, the user may "symmetrize" the model, relative to some parent node, i.e., the user can create a symmetric copy of all children relative to the plane of symmetry of the parent as shown in panel 104. The symmetrized model is shown again in panel 105. The user can add further blobs to the model, e.g., a tail, a head, a nose, and the like, and adjust their relative positions and orientations.

When the approximate model is satisfactory, the user can merge blobs in two ways. In a first way, the user selects two blobs to be merged together into a single larger blob with a fillet at the junction between the blobs, as shown in panel 106, where the forelegs and body have been merged.

Figure 2:
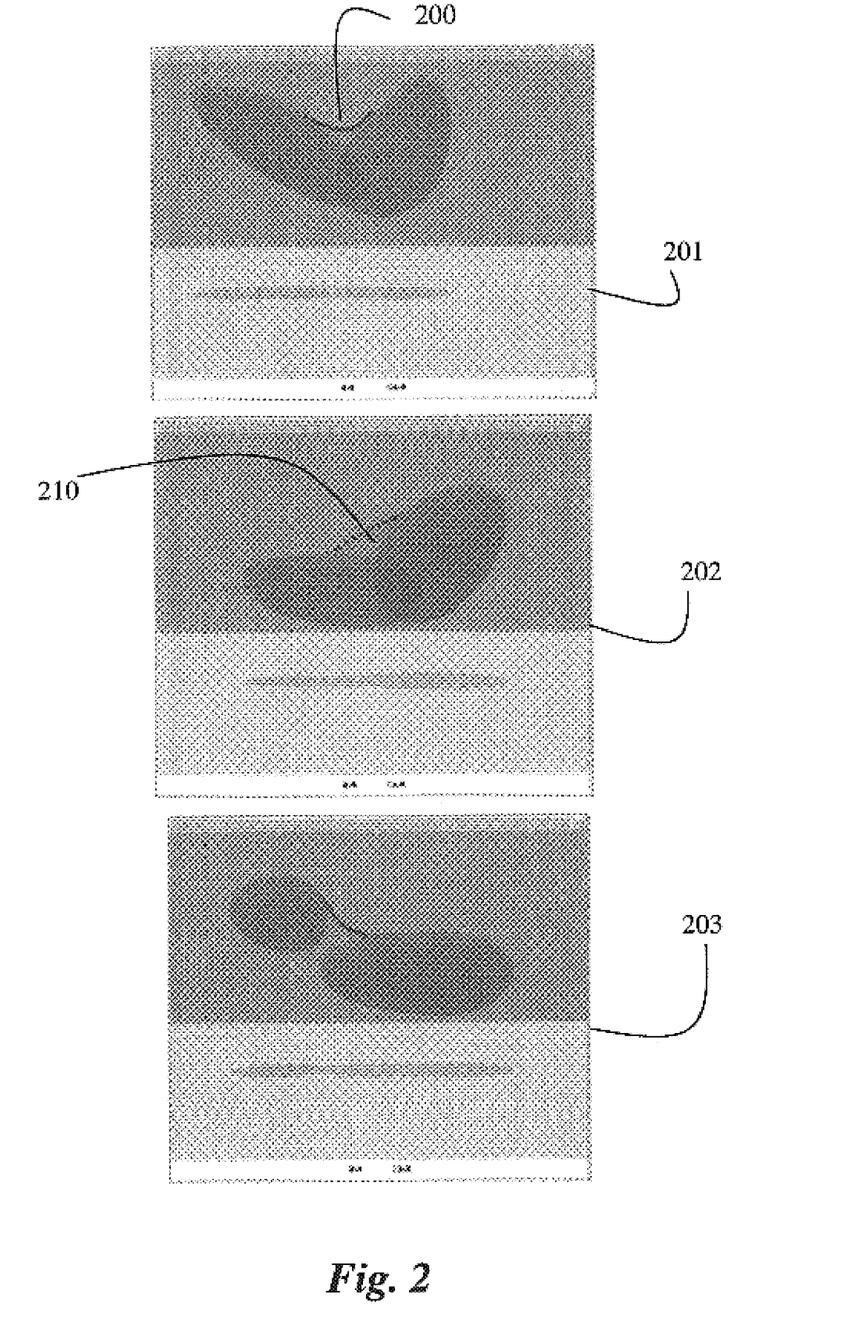
FIG. 2 shows panels of a merging operation according to the invention.

In a second form as shown in panels 201–203 in FIG. 2, the user draws a "guidance stroke" 200 starting on the silhouette of one blob and ending on the silhouette of the other blob. A fillet 210 is placed between the guiding stroke and the blobs so as to approximately match this guidance stroke. The merge operation can also merge non-intersecting blobs, as shown in panel 203. Merging can be used, for example, to join the head and the body blobs of an animal model.

Figure 3:
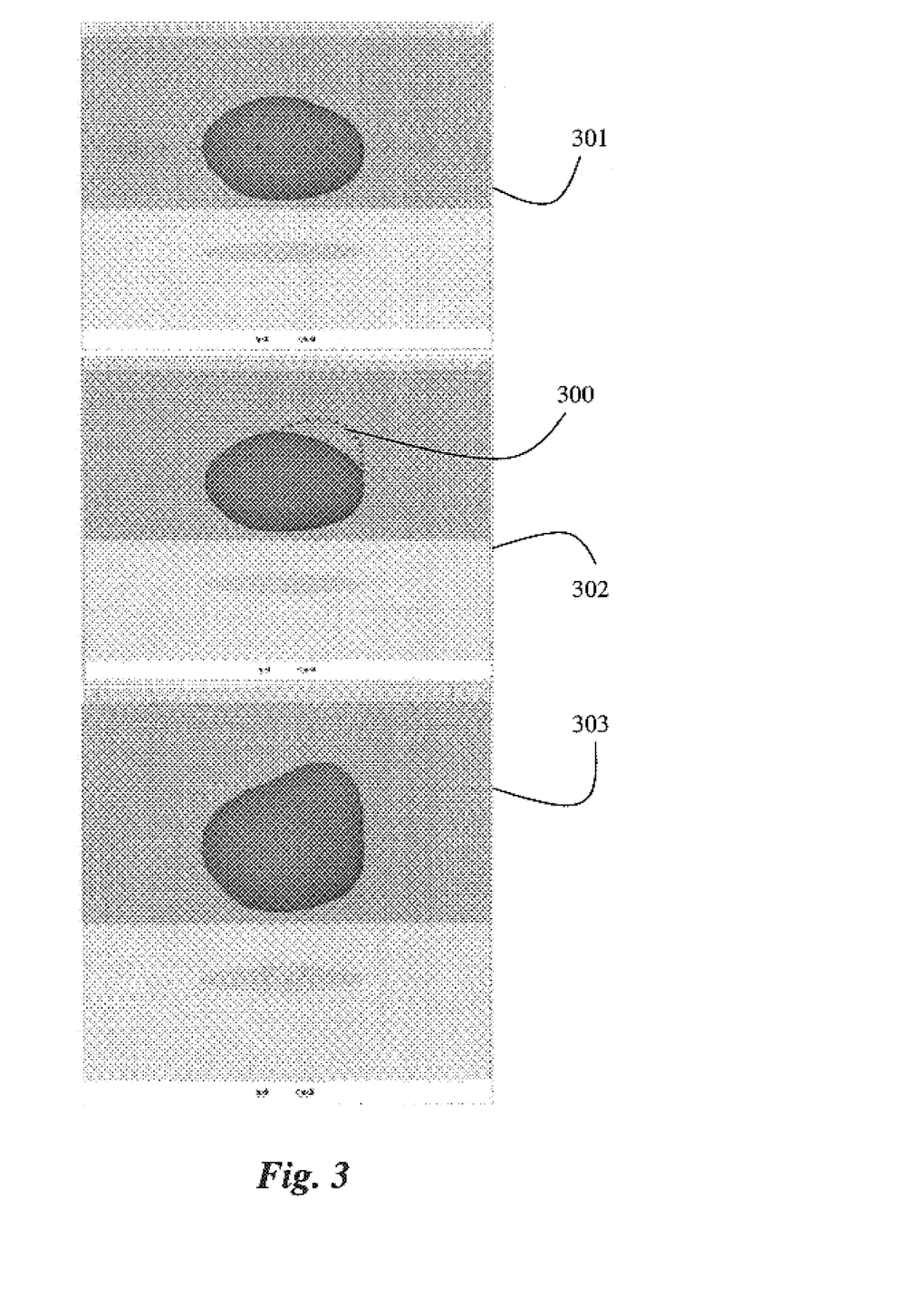
FIG. 3 shows panels of a modification operation according to the invention.

As shown in panels 301–303 of FIG. 3, guidance strokes can also be used to modify the model. The user can draw a stroke 300 starting on an edge of the model, briefly leaving that edge, and then returning to the model. Points on the surface near the stroke are displaced to lie on the newly drawn guidance stroke. Thus, the user can directly make small modifications by sketching, e.g., giving a camel a hump, for instance, or putting a dent in a cushion. Guidance strokes can also be used to redraw a part of a selected blob from any viewpoint.

Figure 4:
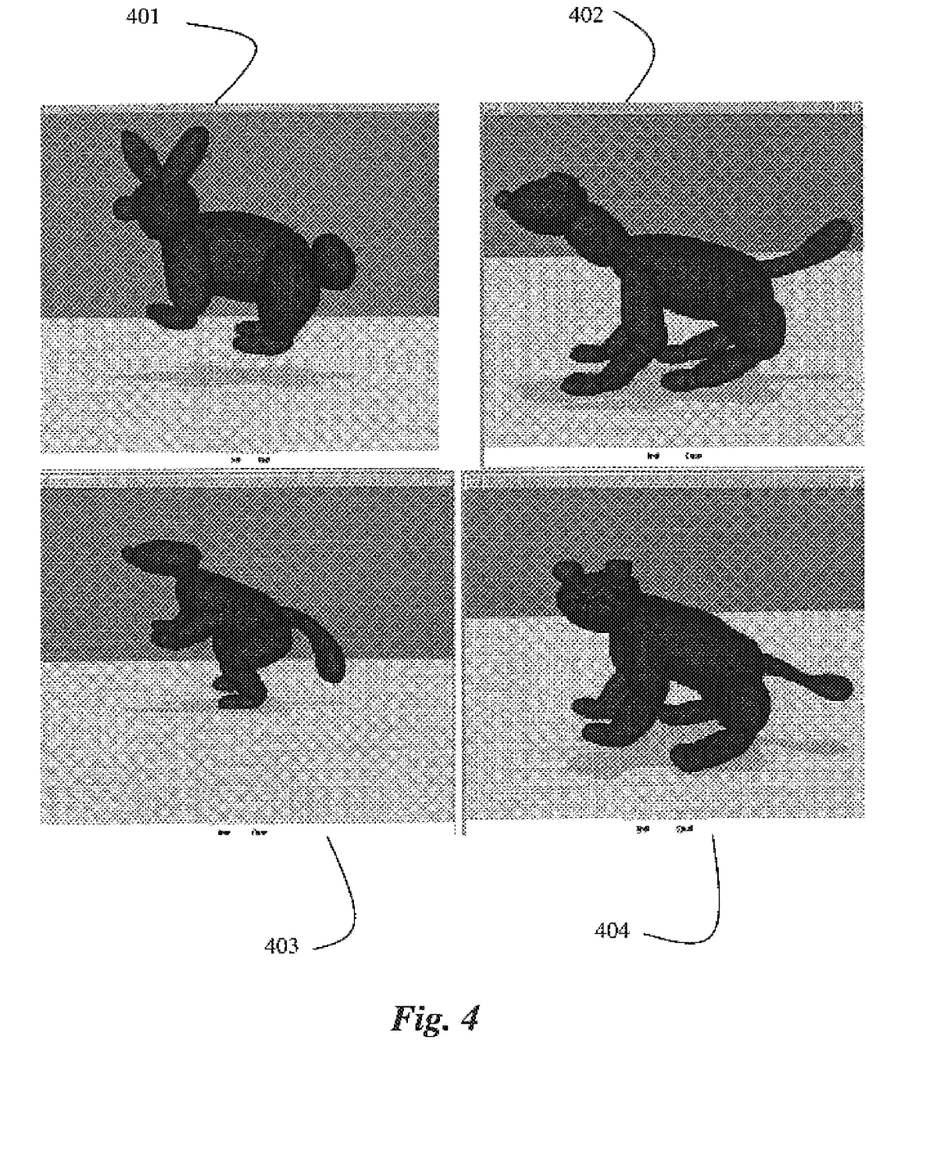
FIG. 4 shows panels of example objects free-form modeled according to the invention.

Panels 401–404 of FIG. 4 shows some examples of animal models built with the system and method according to the invention.

Surface Representation

Variational implicit functions are based on thin-plate interpolation functions that minimize squared secondderivatives, see Turk et al., "Shape transformation using variational implicit functions," Proceedings of SIGGRAPH'99, 1999. These functions are widely used in solving scattered data interpolation problems where a smooth function that passes through a given set of data points needs to be determined. Any such a thin plate function is a sum of an affine term and a weighted sum of radial basis functions, i.e. functions of the form a. $f_i(p)=\phi(\|p-q_i\|)$.

Radial basis functions depend solely on a distance from an argument to the ith data point $q_i$. The exact form of $\phi$ depends on the dimension. For functions defined on $R^3$, the form is $\phi(x)=X^3$.

Thus, any thin plate function can be expressed as $$f(x) = \sum_{j=1}^{n} d_j \phi(x - c_j) + P(x),$$

where the $d_j$s are real-number coefficients, the $c_j$s are "centers" for the basis functions, and $P(x)=a \cdot x+b$ is an affine function of position x.

Given a collection of n locations at which $f$ is to take on particular values, one can select the centers $c_j$s to be the first n-4 given locations, and can then solve for the $d_j$s, and a and b. This is simply a large linear system. Hence, the specification of a variational implicit function is equivalent to the specification of n values at n points.

Constraints

We refer to such specifications as constraints. We consider two kinds of constraints: "zero-points," and "plus-points." A zero-point is a center point $c_j$ at which $f(c_j)$ is zero. This means that the implicit surface $S=\{x \mid f(x)=0\}$ passes through such a point. A plus-point is one for which $f(x)$ is one.

Because we consider points for which $f(x)<0$ to be "inside," the plus-points determine locations which must be outside the implicit surface we are defining. If there is a set of points through which a surface in $R^3$ is to pass, one can build a function $f: R^3 \rightarrow R$ by placing zero-points at given points on the contour, and plus-points at the endpoints of normals to the contour. The level-zero level set of this function is then a surface interpolating the points with approximately the given normals.

It is also worth noting that if the function $$f(x) = \sum_{j=1}^{n} d_j \phi(x - c_j) + a \cdot x + b$$

interpolates the points $c_j$ with values $e_j$, then the function $$f(x-k) = f(x) = \sum_{j=1}^{n} d_j \phi(x - k - c_j) + a \cdot (x-k) + b,$$

$$1. = \sum_{j=1}^{n} d_j \phi(x - (c_j - k)) + a \cdot x + (b - a \cdot k)$$

interpolates the points $c_j+k$ with the same values $e_j$. In other words, translating the "interpolation centers" induces no change in the radial-basis-function coefficients, and just a simple change in the constant of the affine term.

Similarly, if one multiplies all the control points by some fixed rotation matrix R, i.e., replaces $c_j$ with $R(c_j)$, then again the coefficients $d_j$ remain constant, and only the coefficient a changes, being replaced by a'=Ra.

Finally, if we have a real-valued function and build a mesh-approximation of its zero-level surface, then we can take the points of that mesh as zero-points for a new variational implicit function, and the endpoints of mesh normals as plus-points, and thus generate a new real-valued function whose zero-level surface closely resembles the mesh. We use this same concept for inflation, merging, and modification, as described below.

Implementation Details

We begin with some basic details of our implementation, and then move on to inflation, merging, and modification operations. The coordinates of our system are such that the section of the model world that is initially visible at middle-depth is about six units wide. Our view of the model world is through a 512 pixel wide window. By middle-depth, we mean the depth at which strokes are placed into the model world, namely, on the z=0 plane. This choice of size, although arbitrary, is only used to clarify the other dimensions described below.

Inflation

Inflation is a process of converting a 2D input stroke to a 3D blob, represented as a variational implicit surface having a silhouette that matches the stroke. Thus, we transform a 2D visible-contour drawing to a 3D model.

Figure 5:
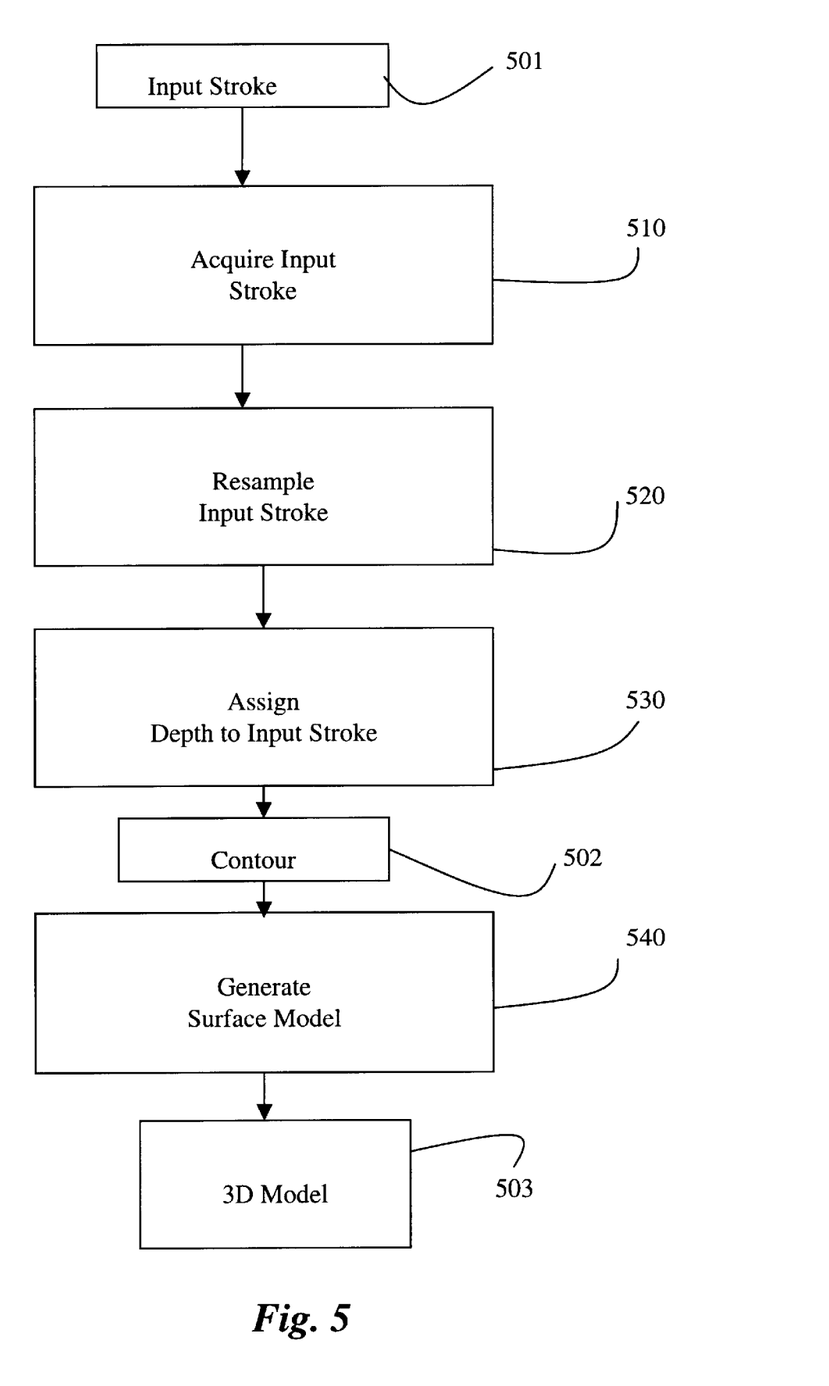
FIG. 5 is a flow diagram of an inflation operation according to the invention.

As shown in FIG. 5, our method follows a sequence of steps. First, we acquire 510 the user-input, i.e., a stroke 501. The stroke can be drawn on the display screen with a mouse and cursor. Then, we re-sample 520 the stroke. Next, we assign 530 depths, i.e., distances from the viewing frustum to the points of the stroke. The resulting path in 3D is called the contour 502. From the contour, we generate 540 a surface model 503 consistent with the locations, including depth, of the points of the contour, by fitting a variational implicit surface to the contour.

Processing an Input Stroke

Using the mouse, user input is acquired as a collection of 2D screen-space coordinates. The user begins the stroke 501 by clicking, and then dragging a cursor over a path of the desired stroke, and finishes by releasing the mouse button. During the input of each stroke, the sequence of 2D points are acquired at a rate depending on the velocity of the mouse, which we cannot control. We re-sample these points so that the points are substantially even spaced. If there are too many points close together in the sequence, then we simply ignore some samples. For example, if the distance between a previous point and a current point is less than 15 pixels, then we do not add the current point. We then "close" the stroke by joining the last point to the first to make a closed curve.

Placing the Constraints

To inflate the input stroke into a blob, we need to explicitly determine the "constraints," i.e., the zero-points and the plus-points that determine a variational implicit function.

Figure 6:
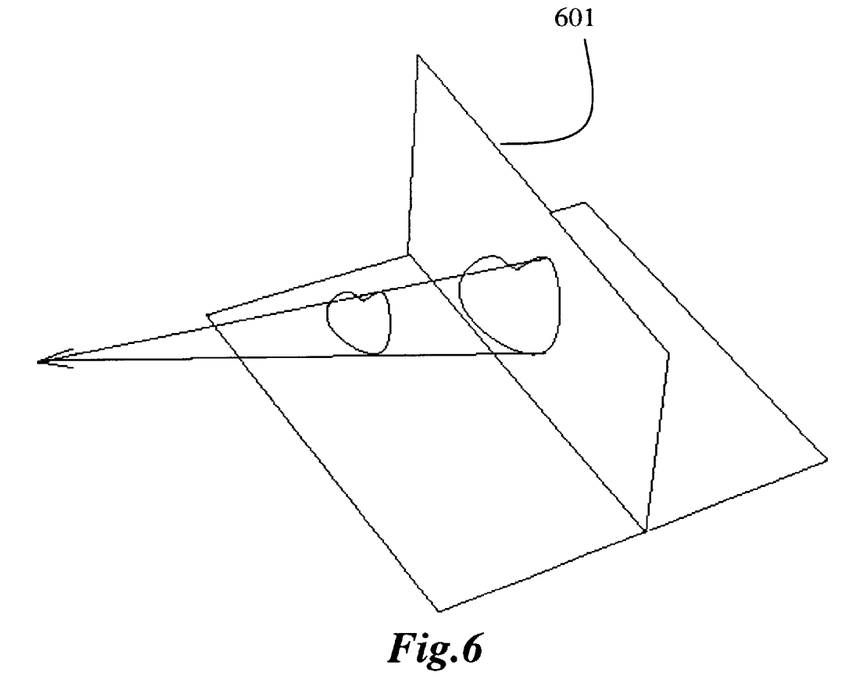
FIG. 6 is a schematic of a projection of an input stroke according to the invention.

As shown in FIG. 6, we first project the sequence of 2D points of the stroke onto the z=0 plane 601. The resulting points are used as zero-points for the implicit function we want to generate. We refer to the path defined by these zero-points as the contour. If the view of the world has been rotated, then we put the points on a plane through the origin, orthogonal to the current viewing direction. To simplify this description, we express the remainder of the construction in an un-rotated frame of reference.

Figure 7:
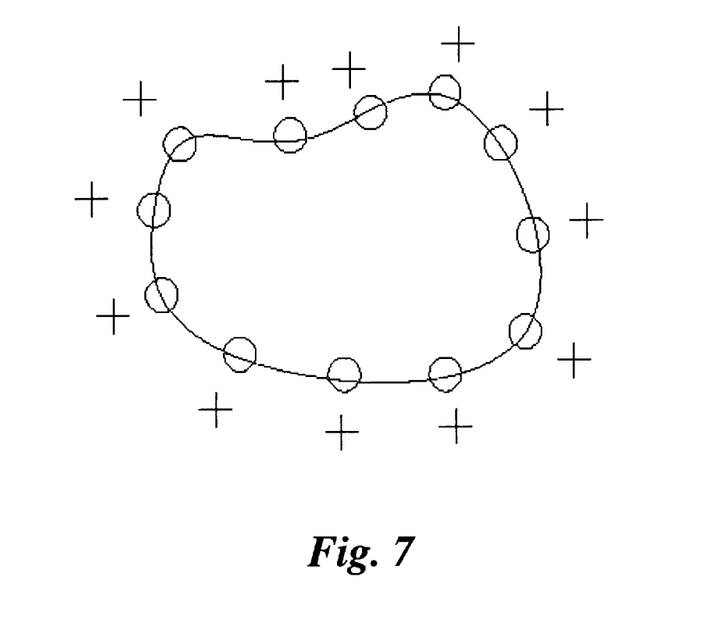
FIG. 7 is a schematic of points defining the input stroke of FIG. 6.

Still within the z=0 plane, we determine points, at a slightly displaced distance, e.g., 0.05, from the zero-points along the normals to the contour, and make these all plus-points as shown in FIG. 7. If all constraints are in 2D, then a degenerate situation results. Therefore, additional constraints can be placed in 3D in three ways.

In a first way, two plus constraints in 3D are placed at the center of mass of the contour. The plus constraints are then moved off the z=0 plane to depths z=depthConst, and z=−depthConst, where we used depth Constant=1.5. This makes the "thickness" of the blob substantially constant and makes a leg look almost as "fat" as a body.

In a second way, instead of having the same thickness for all blobs, we make the thickness depend on the shape of the user's stroke. For example, long cigar-shaped contours become blobs with circular cross-section whose radius is the "width" of the cigar, while spherical blobs appear fairly "fat". We therefore use a simple measure for "width" of the stroke shapes.

Given the 2D shape as a contour, we first find the two points that are furthest from each other. These two points define the major axis or "length" of the contour. Then, we locate the center of the major axis, draw a perpendicular through the centers, and locate the points closest to the center along this perpendicular. This closest distance is our measure for the minor axis or "width" of the 2D contour drawn by the user. We now place the two additional "plus points" as before, but instead displace them not by z=±1.5, but rather by z=±1.5×width.

In a third way, to ensure that the surface curves "in," i.e., away from the outward normal at the z=0 slice as one moves away from the z=0 plane, we take two copies of the stroke and translate one of them in the positive z direction, the other in the negative z direction, and put plus-points at the resulting locations. The distance we move each of the copies is determined as in our second way above. However, now we use z=±0.8×width.

Having determined the set of all zero-points and plus-points, we use the method described above to determine a 3D variational implicit surface based on these constraints. We then use a polygonizer to generate a 3D mesh corresponding to this surface, which is what we can render on an output device. We set the size of the grid-cells in the polygonizer to be 0.5×width, so that even thin contours are polygonized properly.

Hierarchy of Blobs

Figure 8:
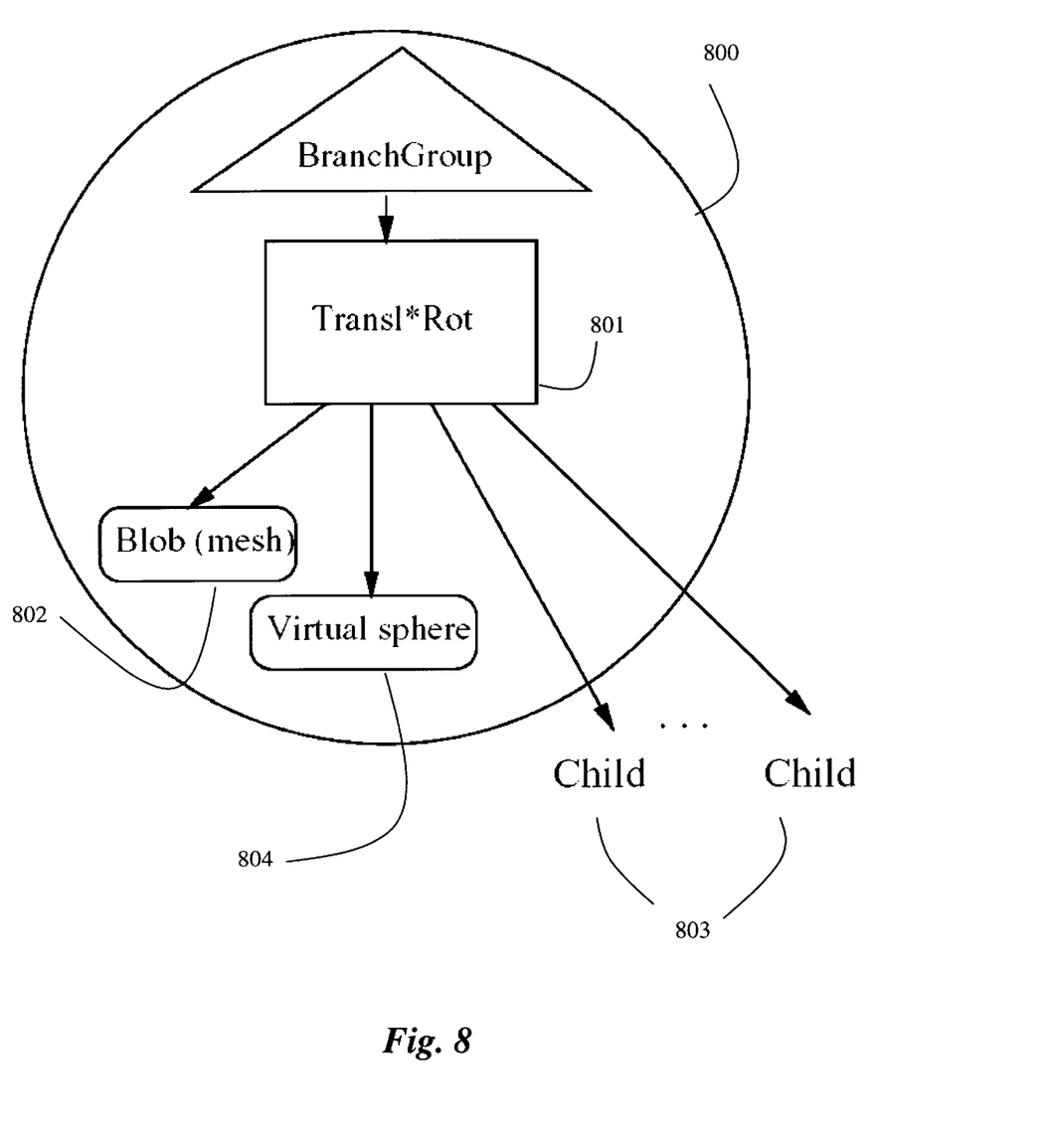
FIG. 8 is a branch graph of a blob in a hierarchical scenegraph.

As shown in FIG. 8, we organize each blob in a hierarchy that can be stored as a scenegraph in a memory. Scenegraphs are well known. Our scenegraph is a tree of branch nodes where each branch node 800 represents a blob, with a modeling hierarchy above them. Each branch node has an associated transformation (Transl*Rot) 801 and shape 802 to render. In our case, the shape for each blob node is the triangle mesh built by polygonizing the implicit function of the blob as described above.

When rendering each blob, the scenegraph is parsed to transform each leaf node. The transformation accumulates by multiplying all the transformations from the nodes that are on the path to this blob.

Initially, each blob is placed according to the position of the 2D input stroke and at some fixed depth. Next, the system attempts to find a parent of this blob based on the intersection with the other blobs. The process for finding a parent for the blob is given below. If the blob does not have a substantial overlap with any of the previous blobs, then it has no parent and is placed on a high level of the hierarchy as an independent blob. If the system finds the parent, then the transformation of the child updated as follows.

Find the "accumulated transformation" of the parent. This is a multiplication of all the transformations in the nodes above the parent. Multiply the blob's transformation from the left with the inverse of the parent's "accumulated transformation." Place the result into the transform node of this blob.

Operations such as rotation around the center of mass of the blob and translation, either in xy-plane or xz-plane update the transformations of the corresponding blob in the scenegraph. Children nodes 803 are updated automatically because of the way the blobs are placed in the hierarchy. The virtual sphere 804 is used to render a transparent bounding sphere when the user is moving any parts of the model.

Figure 9:
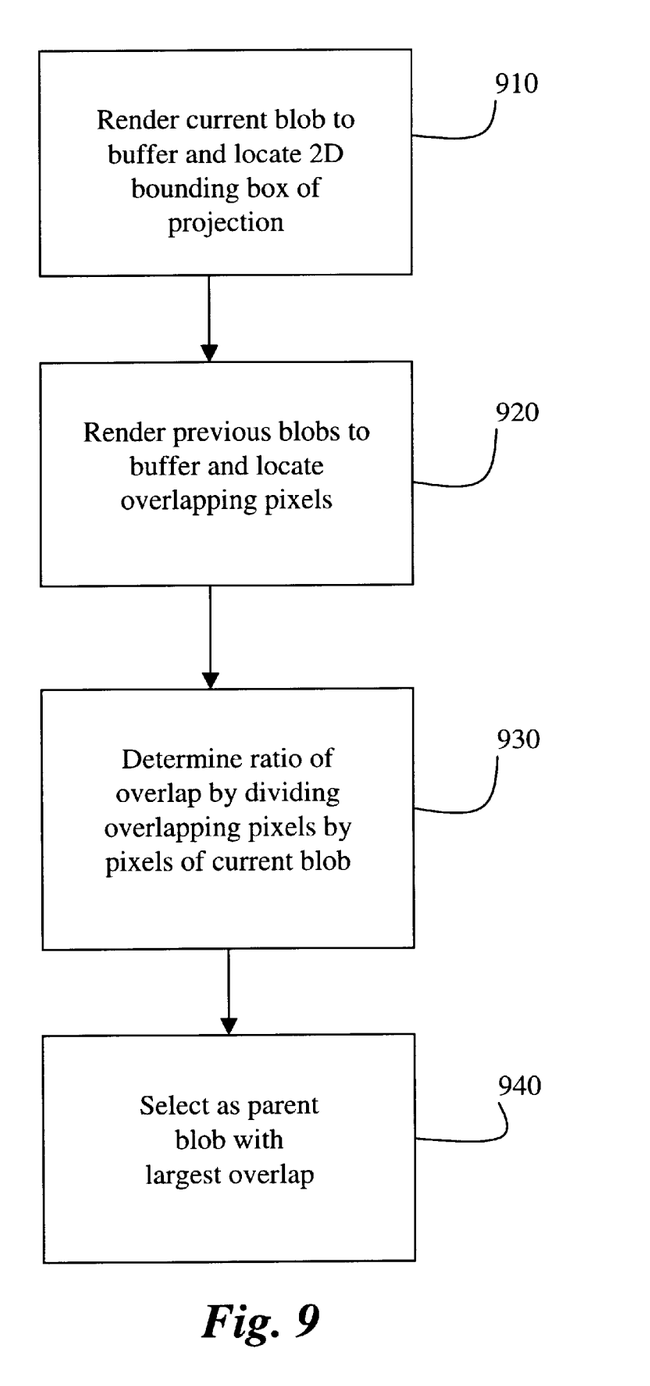
FIG. 9 is a flow diagram of a process for measuring overlap of two blobs according to the invention.

FIG. 9 shows the process for locating the parent of the blob. In step 910, render this blob as an image to an off-screen memory buffer, and locate the 2D bounding box of the projection of this blob. For each blob previously placed in the hierarchy, render the blob to the off-screen buffer and find the amount of overlap with the current blob we are trying to place by comparing overlapping pixels of the two images in step 920. We only need to compare pixels in the sub-area of the image corresponding to the 2D bounding box found in step 910. Step 930 determines a ratio of overlap by dividing the number of overlapping pixels by the area, i.e., pixels, of the current blob. Among all the "parents" for which the ratio of the overlap with the current blob is more than a certain threshold, select 940 the blob with the largest overlap as the parent.

Symmetry Operation

For the "symmetrize" operation, we perform the following steps. For each child of the parent, we find its "pseudo-symmetrical" copy. First, we clone the branch subgraph of a child and change its transformation. If the child has the transformation matrix T relative to the parent, then we extract the translational Tr and rotational Rot components from this matrix. We define the operation "flip" applied to the vector v as follows:

$$\text{Flip}(v)=v-2*(v \cdot n)n,$$

where the n is a normal to the plane of symmetry of the parent.

Then, we generate a new transformation whose translation component is Flip(v), and whose rotational component is determined as follows. If the rotation matrix is the rotation around the axis a with angle φ, then the new rotation matrix is the rotation around the axis Flip(a) with an angle φ.

Merging

To merge two blobs, we want to provide a smooth transition, defined by $f: R^3 \rightarrow R$, and $g: R^3 \rightarrow R$, between two implicit surfaces. We define a function a. $H: R^3 \rightarrow R^2: P \rightarrow (f(P), g(P))$.

Clearly, the function H transforms all points on the level-zero isosurface of f, which we call the "isosurface," the "level zero" being understood, to points on the y-axis of $R^2$. Similarly, the function transforms all points on the isosurface of g to points on the x-axis. Consider a point Q on the positive x-axis. The point Q is evidently on the isosurface for g, but outside the isosurface for f. Similarly, a point on the positive y-axis is on the isosurface for f, but outside the isosurface for g. Letting L denote the union of the positive x- and y-axes, we see that the pre-image of L, i.e., $H^{-1}(L)$, is simply the union of parts of the two isosurfaces that are outside each other.

Figure 10:
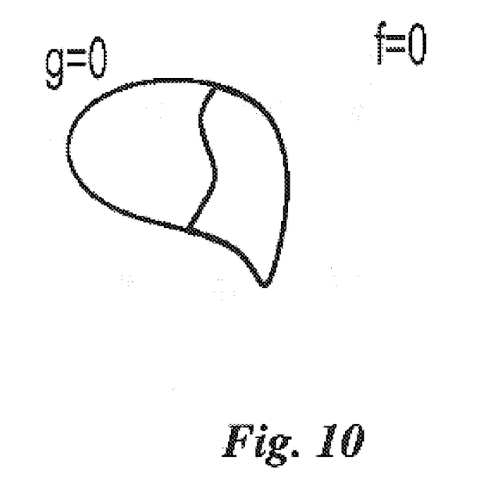
FIG. 10 is diagram of overlapping level sets.
Figure 11:
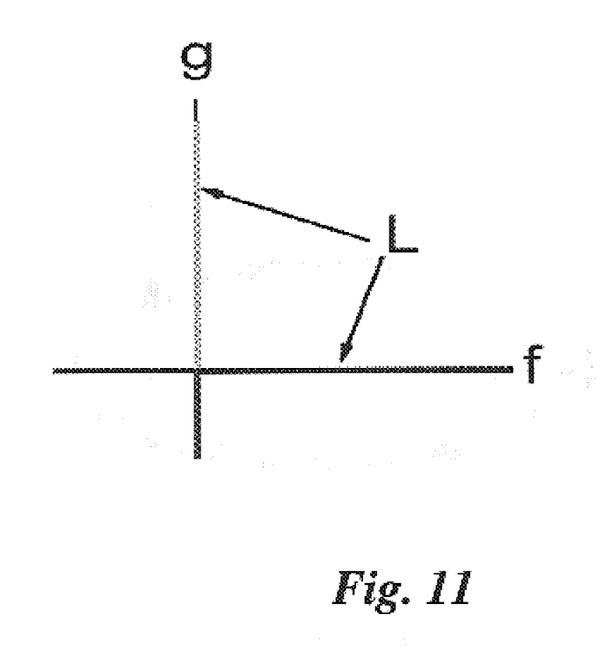
FIG. 11 is a diagram of level sets mapped to two dimensions.

FIG. 10 shows the level set for f and the level set for g intersect. When points of these level sets are mapped to $R^2$ by H, they land at corresponding points shown in FIG. 11. One can see that the pre-image of the positive axes consists of a merge of the "outside" parts of the two level sets.

If we have a function, G: $R^2 \rightarrow R$, whose level-zero level set is exactly L–the union of the two positive axes, then G·H: $R^3 \rightarrow R$ is a function on $R^3$ whose level set is the union of the outside parts of the two level surfaces. If, on the other hand, we have a function G whose level-zero level set is an approximation of L, then the level-surface of G·H is substantially similar to the union of the two outside parts. In particular, if the level set for G deviates from the axes only near the origin, then the level set of G·H deviates only near the intersection of the level sets of $f$ and g.

Automatic Merging

Figure 12A:
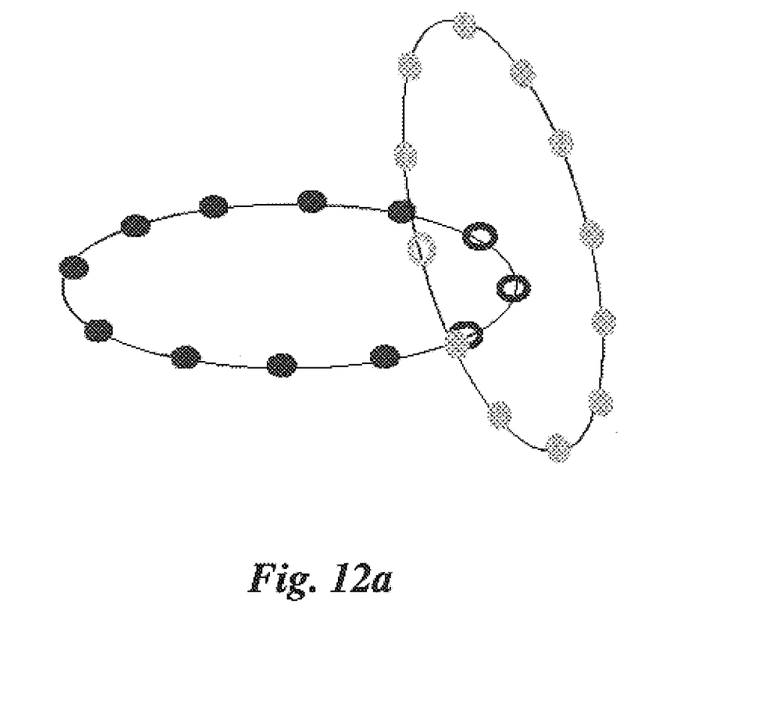
FIGS. 12a–b are diagrams of two blobs to be merged.

As shown in FIG. 12*a*, two blobs are automatically merged with implicit functions $f$ and g as follows. First, each blob is sampled at a fixed resolution and polygonized to generate vertices and corresponding normals, which are used as zero-points and plus-points for a new implicit representation of the blob. We now construct a new implicit function from a subset of these vertices and normals. The vertices and corresponding normals to be eliminated are determined by the restriction (G·H)(P)<0. In other words, we eliminate all vertices v, and their corresponding normal points that lie inside the intersection of the two blobs, i.e., ∀v∈ first blob, eliminate v if g(v)<0, and

•v∈ second blob, eliminate v if $f$ (v)<0.

Figure 12B:
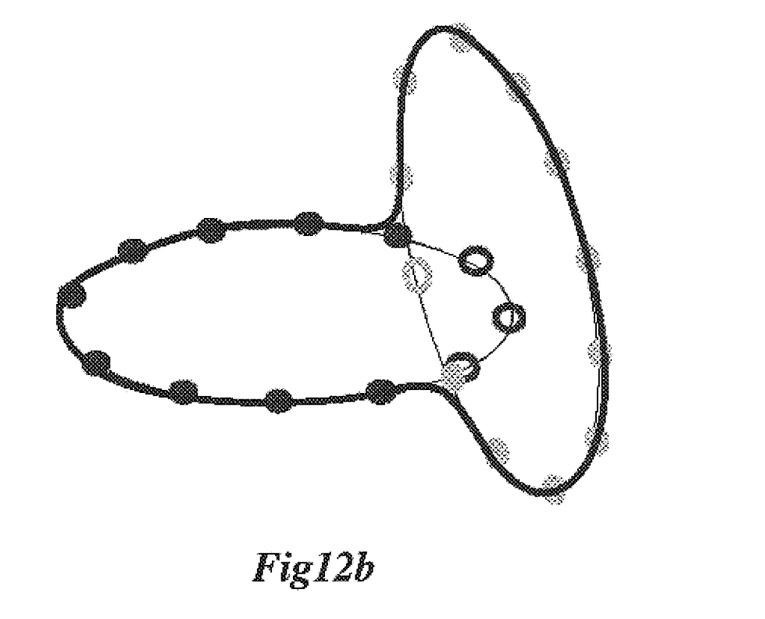

As shown in FIGS. 12*b*, the implicit surface constructed from the remaining vertices and corresponding normals is a smooth merge between the two surfaces. The same process is used to merge additional blobs.

Merging With a Guidance Stroke and Local Influence

Figure 13:
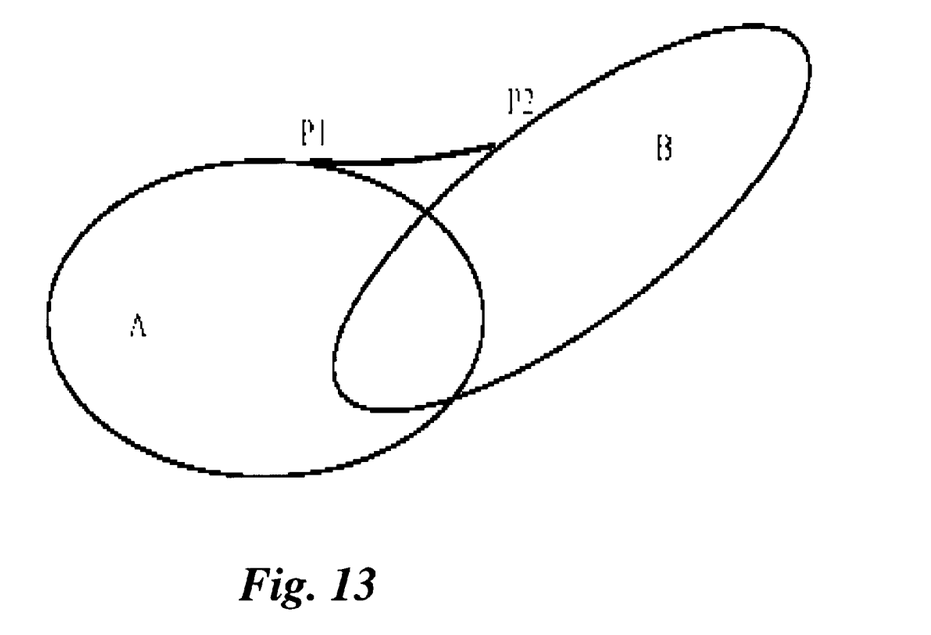
FIG. 13 is a diagram of a guidance stroke for merging blobs.

As shown in FIG. 13, the user can specify the shape of the merged blob in one of the cross-sectional planes along the intersection. In this case, the input includes two blobs A and B, and a 2D guidance stroke 1300. In addition, the user may specify a limit on the region of influence of the guidance stroke specified by a 3D distance α.

The influence of the guidance stroke decreases with distance from the stroke. Beyond the region of influence on the two implicit surfaces, the resultant merged surface is the same due to the automatic merge describe above. Below, we describe the process for determining a merging function G in an extrusion space.

We locate the start and end of the guidance stroke, respectively S and E, by finding the nearest silhouette points P1 and P2 on blobs A and B. We then project the 2D guidance stroke onto the plane passing through S and E and parallel to the average normal at those two points.

Without a loss of generality, if S lies on A and E lies on B. The extrusion space coordinates then are $(f1(S), f2(S))=(0, s)$ and $(f1(E), f2(E))=(e, 0)$. We sample the guidance stroke and plot the samples in the extrusion space by computing implicit function values $(f1, f2)$.

Figure 14:
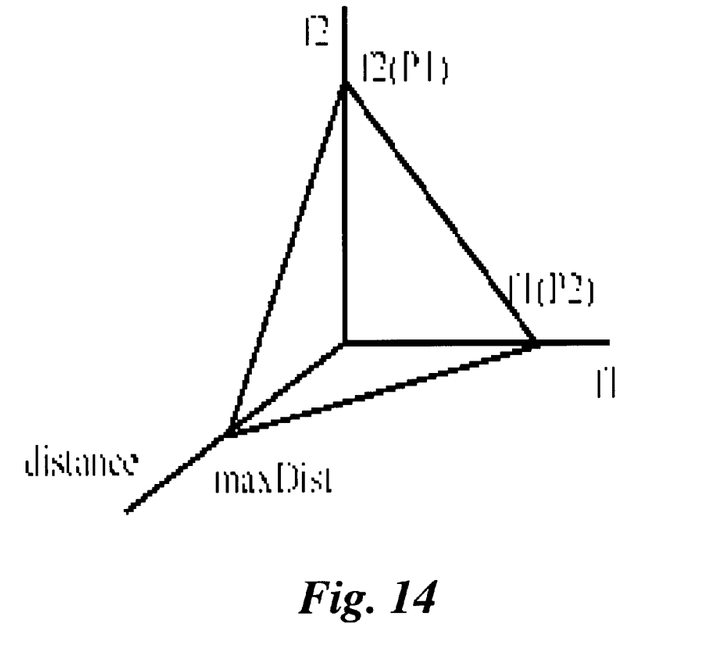
FIG. 14 is a diagram of a 3D extrusion space.

As shown in FIG. 14, we achieve a smooth transition with limited region of influence by adding a third dimension to the extrusion space. The third coordinate d(x) for a 3D point x is the minimum of the Euclidean distance to points S or E. In the extrusion space, the surface generated by guidance stroke in $f1$-$f2$ plane and point (0, 0, α) indicates the blending surface $G(f1, f2, d)=0$. The shape of this surface, also indicates the shape of the new surface in the blended region. Note, however, we do not explicitly construct this surface in the extrusion space.

For a practical implementation, we eliminate all vertices in the region of influence, and add new zero-points corresponding to the sampled locations on the 3D guidance stroke. For example, for vertices on blob A, we eliminate all v for which $(f2(v)<\delta 2)$ or $(f1(v), f2(v), d(v))$ is inside the triangle with vertices (0, s, 0), (0, 0, α) and (0, 0, 0).

Similarly for blob B, we eliminate all vertices vfor which $(f1(v)<\delta 1)$ or $(f1(v), f2(v), d(v))$ are inside the triangle with vertices (e, 0, 0), (0, 0, α) and (0, 0, 0).

For each new point added from the projected and sampled guidance stroke, the normal direction is normal to the guidance curve in the plane of projection. Finally, the new merged surface is generated from the remaining constraints on blobs A and B, and the new constraints from the guidance stroke.

Modification of Blobs

We provide means for making modification of the profile of a blob by drawing a new target stroke, see FIG. 3. The shape near to the target stroke is modified with the influence limited by 3D distance from the stroke. There are many 3D techniques to make local modifications, but most of them work on polygonal meshes. They involve cumbersome process of finding displacement vectors in the region of influence that vary smoothly across the region. Some 2.5D techniques deform the polygonal meshes so that they conform to the target profile stroke from the given viewpoint, but appear to have artifacts from a different viewpoint, for example see Corrja et al., "Texture mapping for cel animation," Proceedings of SIGGRAPH'98, pp. 435–446, 1998

Instead, we use an idea similar to the one used for merging with guidance stroke above. The input is a blob and a target stroke near its silhouette. In addition, there is a limit on the region of influence specified by a 3D distance τ. The main idea is to eliminate zero-points and corresponding plus-points in the region of influence and add new zero- and plus-points from sampled and projected 3D target stroke.

Note that the user draws only a target stroke and does not draw a source stroke, as required by Corrja. The source silhouette is automatically determined for the viewpoint in which the target stroke is specified. This is an important difference in the interface when compared with the prior art. This difference provides simplicity and eliminates the often seen error in clicking on or specifying the source stroke. By providing only new constraints and relying on the mechanism for fitting variational implicit surfaces, we also avoid the problem of enforcing smooth variation in the displacement vector along the modified surface.

We first find the nearest silhouette point for the start and end of the target stroke, and assign 3D coordinates, S and E, as before. The target stroke is assumed to be "snapped" to these points where the stroke is within a few pixels. Otherwise, the target stroke is rejected. Next, we project the target stroke on the plane passing through S and E and parallel to the average normal at those two points, generating a planar 3D curve. For each point on the curve, we find the nearest silhouette point on the blob. This automatically generates the corresponding source stroke. We locate the region of influence, by comparing 3D Euclidean distance of each vertex on the blob with respect to the source stroke.

We assign a normal to each point on the sampled target stroke in the direction normal to the stroke and parallel to image plane. This provides new zero- and corresponding plus-constraints. The vertices in the region of influence are eliminated. The reconstructed implicit surface has a matching target profile because the surface interpolates the zero-points on the target stroke and respects the specified normals parallel to the image plane.

Figure 15A:
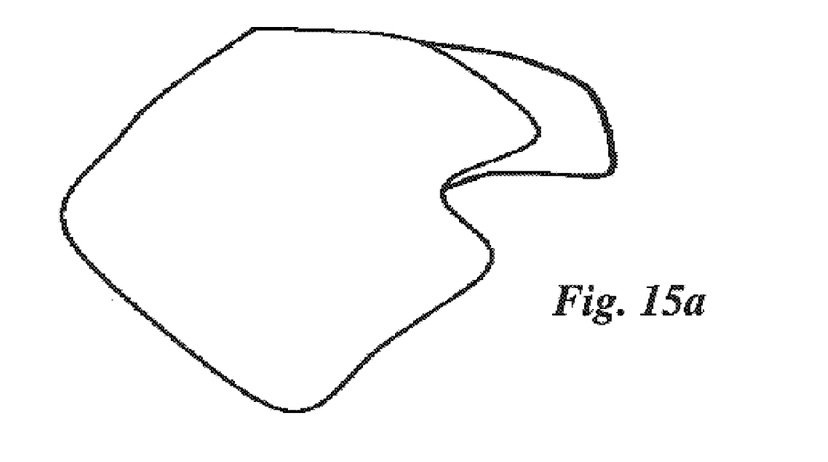
FIGS. 15a–c show a process of blob modification.
Figure 15B:
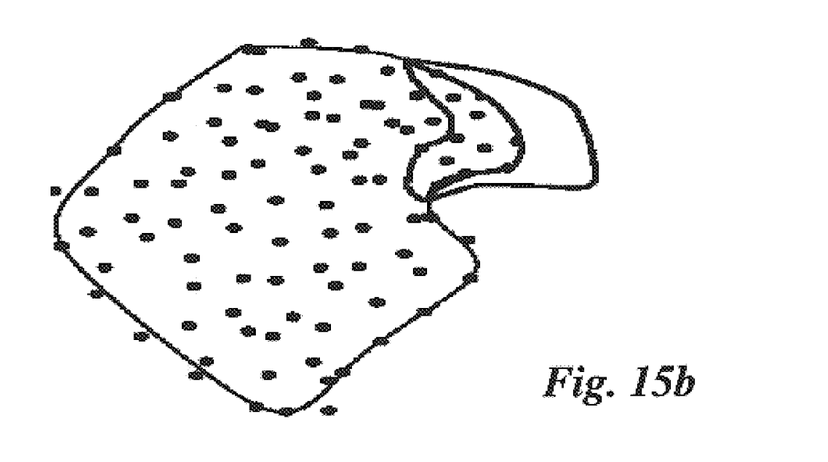
Figure 15C:
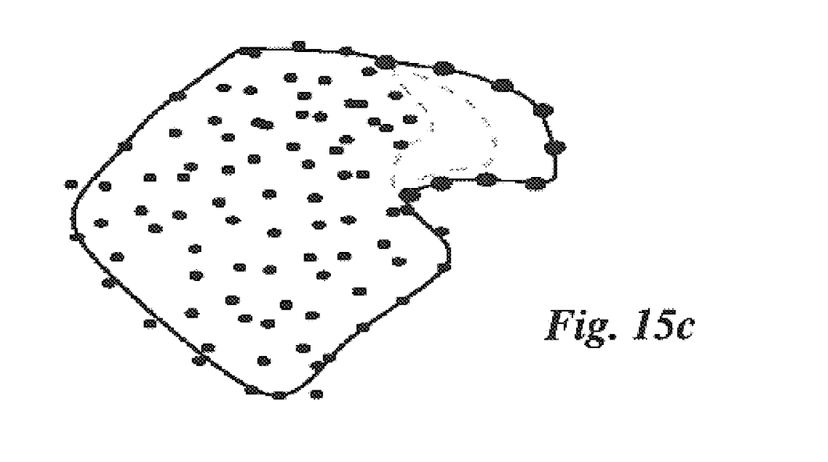

FIGS. 15*a–c* show the process of blob modification beginning with a target stroke in FIG. 15*a*. FIG. 15*b* shows zero-points in the region of influence, and FIG. 15*c* the modified blob where new zero-points are added.

Effect of the Invention

We have described a system and method for generating free-form models from gestural input, using variational implicit surfaces organized in a modeling hierarchy as a surface representation. Our choice of modeling operations allows users to construct models in a way that closely parallels the way that they draw, starting from basic forms and then refining.

The advantage of the implicit surface representation is that the natural modeling operations—inflation, merging, stroke-based merging—are all easy to implement in this context.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for free-form sketching a renderable 3D model, comprising:

acquiring an input stroke as a sequence of 2D points from an input device;

resampling the 2D points;

assigning depth values to the resampled 2D points to form a 3D contour; and fitting a variational implicit surface to the 3D contour to generate a 3D blob forming the 3D model to be rendered on an output device, wherein the variational implicit surface is based on thin-plate interpolation functions that is a sum of an affine term and a weighted sum of radial basis functions.

2. The method of claim 1 wherein the input stroke is sketched on a display screen by a user with a mouse as the input device to generate the sequence of 2D points.

3. The method of claim 1 wherein the resampled points are substantially even spaced.

4. The method of claim 1 further comprising:

closing the input stroke by joining a last point to a first point of the sequence.

5. The method of claim 1 further comprising:

constraining the 3D contour by zero-points and plus-points, the zero-points located on the 3D contour, and the plus-points baited outside the 3D contour at a predetermined distance normal to the zero-points.

6. The method of claim 1 wherein a plurality of input strokes are acquired to generate a plurality of 3D blobs forming the 3D model.

7. The method of claim 6 further comprising: organizing the 3D blobs as nodes in a hierarchical scenegraph stored in a memory.

8. The method of claim 6 further comprising:

polygonizing the variational implicit surface of each 3D blob as a triangular mesh when rendering the 3D model.

9. The method of claim 7 further comprising:

rendering each 3D blob to an off-screen buffer as an image;

measuring an amount of overlap between a current 3D blob and each previously generates 3D blob; and selecting a particular 3D blob having a largest amount of overlap with the current 3D blob as a parent 3D blob in the hierarchical scenegraph.

10. The method of claim 6 further comprising: merging selected 3D blobs with a guidance stroke.

11. The method of claim 6 further comprising:

modifying selected 3D blobs by a target stroke.

12. A system for free-form sketching a renderable 3D model, comprising:

an input device for generating an input stroke as a sequence of 2D points;

means for resampling the 2D points;

means for assigning depth values to the resampled 2D points to form a 3D contour; and means for fitting a variational implicit surface to the 3D contour to generate a 3D blob forming the 3D model, wherein the variational implicit surface is based on thin-plate interpolation functions that is a sum of an affine term and a weighted sum of radial basis functions; an output device for rendering the 3D model.

* * * * *